Sept. 12, 1933.   J. P. BEM   1,926,965
FRUIT PITTER AND CORER
Filed Nov. 1, 1930   2 Sheets-Sheet 1

INVENTOR.
JOSEPH P. BEM
BY
ATTORNEYS.

Sept. 12, 1933.    J. P. BEM    1,926,965
FRUIT PITTER AND CORER
Filed Nov. 1, 1930    2 Sheets-Sheet 2
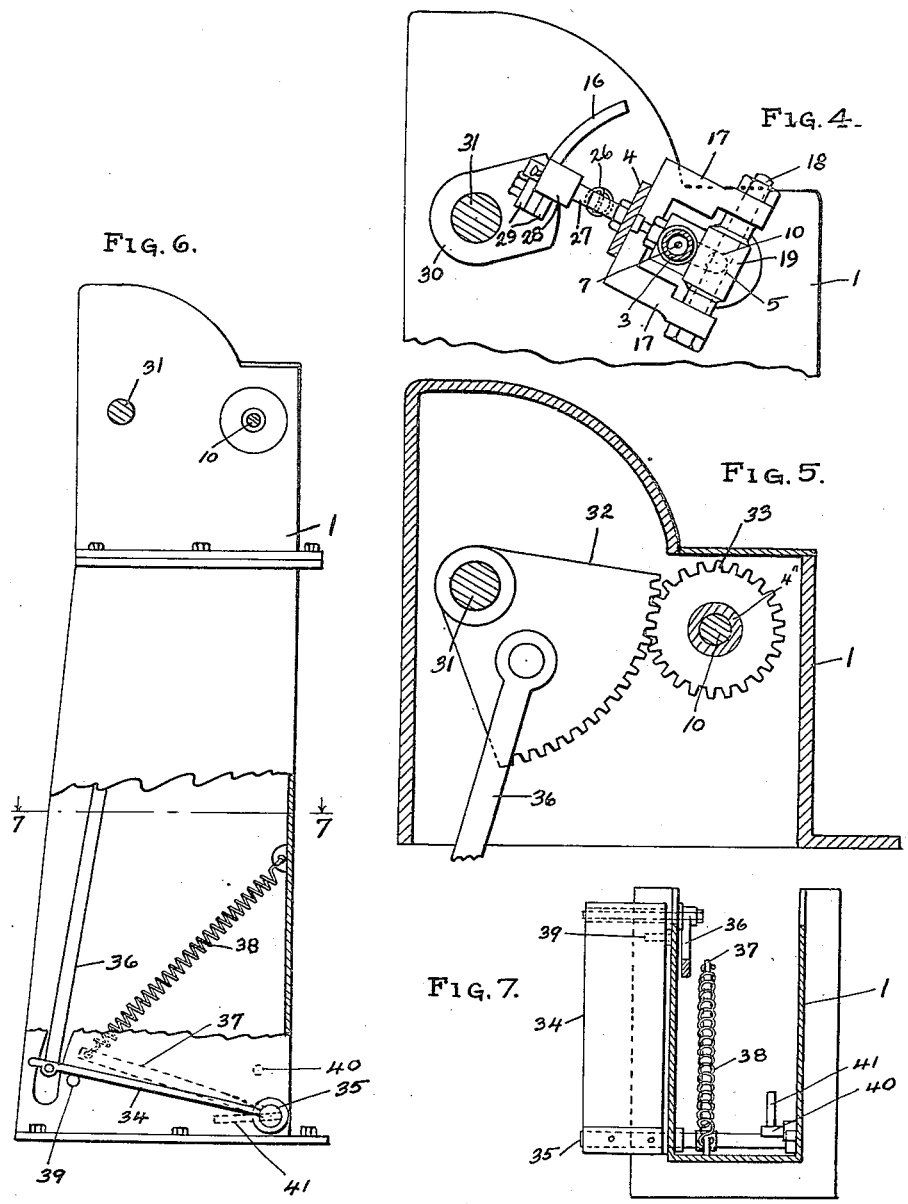
INVENTOR.
JOSEPH P. BEM
BY
ATTORNEYS.

Patented Sept. 12, 1933

1,926,965

UNITED STATES PATENT OFFICE 1,926,965

FRUIT PITTER AND CORER

Joseph P. Bem, Oakland, Calif., assignor to Pacific Pitting Machine Company Inc., Fresno, Calif., a corporation of California Application November 1, 1930. Serial No. 492,774

17 Claims. (Cl. 146—28)

This invention relates to machines for pitting and coring fruit preparatory to canning the same, and has for its objects improvements in such machines whereby previously bisected fruits may be quickly pitted or cored, also such a machine which will be much simpler than prior machines adapted to do equal quality of work.

Other objects of the invention will appear in the following description.

Briefly described, my improved fruit pitter and corer is of a type which operates on the halves of fruit as have been previously produced on some fruit bisecting machine, in which machine the fruit is halved directly through the core, or pit of a drupe, so that further operation is necessary to remove the half-cores or the half-pits as the case may be. The fruit-halves are presented one after the other to the present machine by an operative, and a vibrating arched blade swings around to cut out the pit or core. The blade hugs the pit so as to waste little or no meat, and in the case of simple coring of fruit such as pears, an adjustable cam controls the shape of the cut.

In the form shown in the drawings the machine is a pedestal affair with a horizontal arm carrying the vibrating arched blade, and the fruit halves are presented by hand one at a time against the under side of a yoke under the blade all arranged in such a manner that the operative looking directly down upon the blade can see just where the blade will enter the fruit, and the blade is tripped each time by the operative.

In the drawings accompanying this application Fig. 1 is a plan view of the machine drawn about half size.

Fig. 4 is a vertical section of Fig. 1 as seen from the line 4—4.

Fig. 5 is a vertical section of Fig. 1 as seen from the line 5—5.

Fig. 6 is a vertical section of Fig. 1 as seen from the line 6—6.

Fig. 7 is cross section of Fig. 6 as seen from the line 7—7 thereof.

Figure 1:
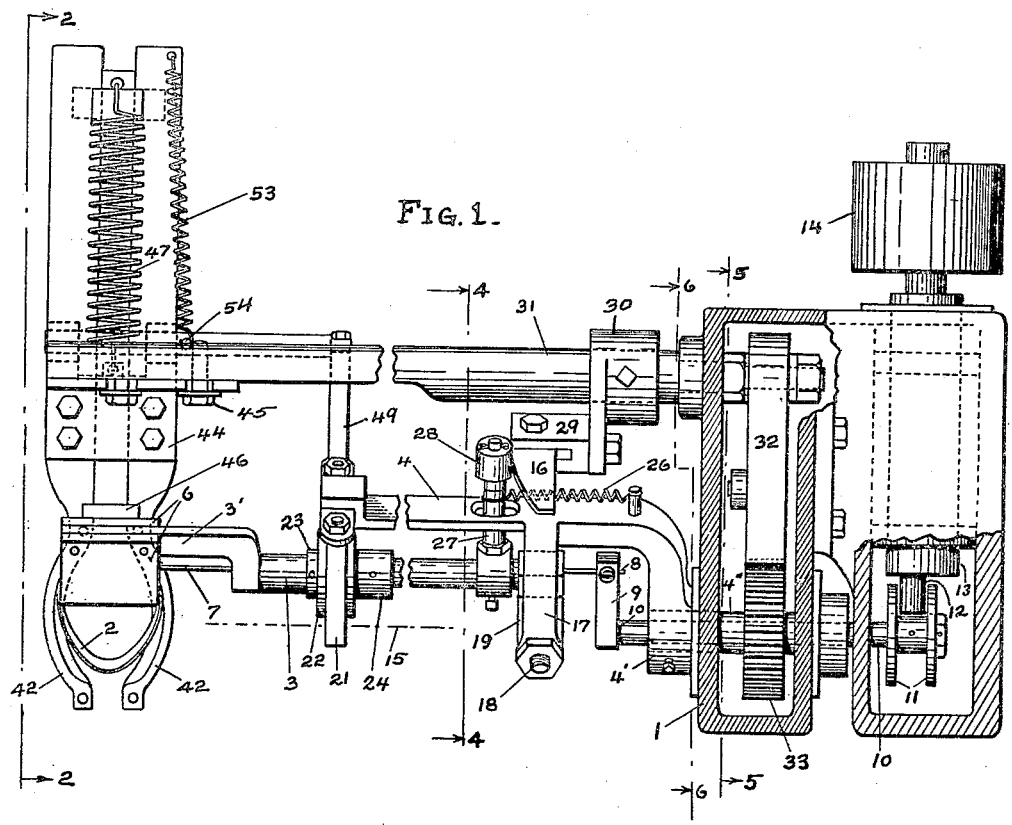
Figure 1:
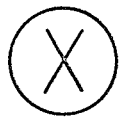

In further detail the machine comprises a pedestal-like housing 1 with the arched pitting blade 2 on the end of a horizontal shaft or bar 3 supported in a revolvable bracket or arm 4 extending from the end of a hollow shaft 4" at the left side of the pedestal at a convenient height so as to bring the blade 2 about table height above an operative's lap when seated before it at the position X.

Arched blade 2 is pivotally mounted (by means not shown as not involved in the present invention) in a small housing 6 secured at the end of the shaft or bar, the end of which is flattened and offset as indicated at 3'. Shaft 3 is hollow for the passage of a stiff wire 7 for vibrating the blade arcuately on its pivotal mounting, while the other end of the wire is secured at 8 to a short arm 9 on the outer end of a reciprocatory rod 10 which extends slidably through the hub 4' of bracket 4 and its hollow shaft 4" into the pedestal housing where the rod 10 is provided with a double flanged collar 11 vibrated axially with rod 10 by the revolutions of a small crank 12 of a high speed shaft 13 either belted by means of a pulley 14 to a source of power or directly connected to a motor for continuous operation so that the blade may be kept in continuous vibration while in use.

Shaft 3 does not revolve relative to bracket arm 4, but is pivotally mounted on the bracket in a manner to permit blade 2 to rise and fall to the shape of the pit or core to be cut, and revolves bodily with and upon turning of the bracket on its hollow shaft 4" the axis of which if extended as per dotted line 15 would pass through the plane of the arch of the blade 2 at a point just above the pivotal point 5 of the blade rocker so that in revolving the bracket the blade would normally revolve as from this axis were its motion not modified by the contact of the blade with the pit or through the agency of a cut controlling cam 16 to be presently described.

Figure 2:
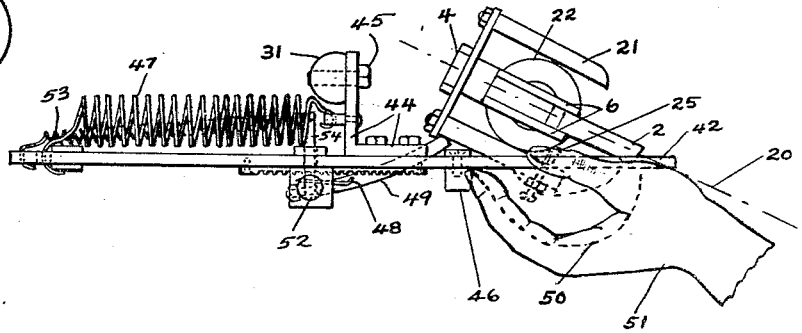
Fig. 2 is a view of the end of the machine as seen from the line 2—2 of Fig. 1.

The pivotal mounting of blade shaft 3 on bracket 4 is accomplished through means of a pair of forwardly and downwardly extending arms 17 on the bracket pivoted at their ends by a bolt 18 to a lug 19 secured to and extending from one side of the shaft 3 in a manner so that the axis of the pivot bolt will cross the axis 15 around which the blade revolves, thus permitting the free end of the shaft to swing on the pivot axis, initially at the angle 20 indicated in Fig. 2 and constantly changing as the blade shaft revolves upon turning the bracket so that when the arch of the blade is pointing directly downward it will be able to rise and fall in the fruit vertically, or in other words always move in a plane parallel to the plane of the arch.

To stabilize and guide the shaft 3 in the path of movement defined, the outer end of bracket 4 is provided with a yoke comprising a pair of guides 21 between which operates a large roller 22 loosely mounted on shaft 3 between flanges or collars 23, 24, while a set screw 25 projecting through one of the guides provides an adjustable stop to limit the outward movement of the shaft.

The shaft is resiliently urged inward or toward bracket 4 by means of a tension spring 26 on the bracket pulling on an arm 27 secured to and projecting from the upper or inward side of the shaft and carrying a roller 28 at its end which is resiliently held against a cam 16 by the tension of the spring.

Cam 16 is a plate with a suitably formed guiding edge against which the roller operates and it is adjustably clamped in a bracket 29 in turn adjustably bolted to a hub 30 adjustably secured to a relatively heavy horizontally extending supporting arm or bar 31 firmly mounted at one end to the wall of the pedestal stand and serving at its inner end as a bearing pin for a segment gear 32 which engages a small gear 33 secured to hollow shaft 4" of bracket 4 so that upon rocking the segment the bracket 4 and hence the blade shaft 3 and its blade will likewise be rocked.

Segment gear 32 is rocked by a foot pedal 34 pivoted at 35 to the lower left side of the pedestal base and connected to the segment gear by a pivoted rod or link 36. Pivot 35 is a small shaft secured to the pedal and within the pedestal housing is a small arm 37 secured to the pedal shaft and connected by a tension spring 38 to a point on the pedestal so that the pedal after being depressed to a stop 39, as indicated in full lines in the drawings Fig. 6, and then released by the operative, will be returned by the spring to the limit as provided by a stop 40 on the wall of the pedestal engaging a second small arm 41 projecting from the pedal shaft.

The arrangement and proportion of the gears and movement of the pedal is such that upon depression of the pedal the arched blade 2 will swing to the starting position shown in Fig. 1, and upon release of the pedal the blade will swing on its cutting stroke from the position shown in Fig. 1 downward and around about a third turn to extend in the opposite direction from that shown. It should be noted that the cutting stroke of the blade is carried out under the influence of pull back spring 38 only so that the blade may stop at any point in its path of travel should it meet an unusual obstruction on a pit, and that by stepping on the pedal the blade will at once back out of the cut, and thus the blade may be worked back and forth in the cut should it be necessary to free it or enable it to get a fresh start.

Figure 3:
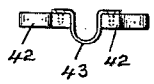
Fig. 3 is view of the front end of the yoke showing an additional blade thereon as used when coring pears.

During the cutting stroke of the blade, the fruit half is held in the palm of the operative's hand, flat side of the fruit half upward, and pressed against the substantially flat bottom of a small yoke or pair of curved arms 42 spaced to permit the passage of the blade between them, and when the machine is used for coring pears a small knife is secured across the arms 42 at front and rear of the fruit, the knife being of the form as indicated in Fig. 3 hanging down between the arms 42 in the form of a small loop 43 so that as a half pear is slid into place for coring the loop of the knives will cut out the stem preceding the core and also the objectional central strip from the core to the bloom end of the fruit.

The rear ends of arms 42 are firmly mounted on a bracket 44 secured in turn to supporting bar 31 preferably as by being bolted as at 45 to the flattened forward face of the bar, while between the rear ends of the arms 42 and slidably guided by them is a slidable plate or stop 46 resiliently pulled forward by a spring 47 to the limit as shown in Fig. 1, and which stop is for the purpose of supporting the bloom end of a half-fruit, such as a half-peach against the dragging action of the blade as it swings rearwardly through the fruit under the pit.

The forward end of the sliding stop extends below the under surface of arms 42 as shown in Fig. 2 and is normally so far forward under the action of spring 47 that it must be pushed back more or less by the tip of each fruit-half in adjusting the same in proper position for the blade 2 to enter at the stem end of the fruit, and the moment the cutting blade starts to swing, this stop 46 is locked in whatever position it happens to be, by means of a small spring latch 48 mounted on a rotatable shaft 52 in turn rotatably mounted on bar 31 and provided with a forwardly projecting arm 49 contacted by one of the guides 21 of bracket 4 to thus release the latch from engagement with locking grooves, formed across the slide or small rack bar 56 secured thereto as indicated in Fig. 2, when the blade is in starting position only. Thus the stop is free to slide back against spring 47 when placing the fruit-half 50 against the stop by the hand 51 of an operative, but is instantly locked the moment the blade begins to swing so that the tip of the fruit is braced against an immovable member during the cutting stroke so as to effectually resist the dragging action of the blade.

Latch shaft 52 is resiliently urged in direction of latching by means of a light spring 53 extending from the rear end of one of the arms 42 to a pin 54 projecting from the side of the shaft.

It will be noted that by the construction described the blade has but three movements, i. e. arcuate vibration, swinging on axis 15, and up and down motion in the plane of the arch to vary the depth of the cut.

The cam 16 may be of a length and shape to control the minimum depth and shape of the cut at all points as would be required for the elongated cut in coring pears, or it may be so adjusted or shaped as to control the quick entry of the blade almost vertically into the fruit at the start only to get under the stem end of a pit in a bisected drupe, and then fall away so that the pit itself will be the sole guide to determine the shape of the cut for the remainder of the stroke.

From the operation of the apparatus it will be seen that axis of swinging or rotation of the blade is the axis 15 of the bracket shaft 4" and hence this is the shaft which rotates the blade, and that small shaft 3 is a carrier for the blade pivoted at 18 to the bracket-shaft combination so that the blade can rise and fall and that the spring 26 urges this carrier shaft to the cam 16 or stop limits of the mounting.

It should also be observed that the form of the fruit positioning arms 42 or yoke provide for manually supporting a half fruit against its under side by the hand of an operative and for the fingers of the hand to embrace the edges of this yoke as indicated in Fig. 2 to thus steady the fruit against displacement. Any member against which the fruit is held may therefore be termed a "fruit support".

Having thus described my invention it will be seen that considerable variation can be made in the precise details without departing from the spirit of the invention as sought to be covered in the construction defined in my appended claims.

I claim:—

1. In a fruit pitting machine, a shaft, means rotatably supporting the shaft, an arched blade carried by the shaft, means for turning the shaft to swing said blade in an arcuate path for removing the pit or core of a fruit half presented thereto, a support for supporting the fruit during the pitting operation formed and arranged to cooperate with the hand of a person in positioning the fruit thereagainst as said blade is swung, said support including a movable member bearing against and steadying said fruit while held by the hand.

2. In a fruit pitting machine, a shaft, means rotatably supporting the shaft, an arched blade carried by the shaft, means for turning the shaft to swing said blade in an arcuate path for removing the pit or core of a fruit half presented thereto, a support for supporting the fruit during the pitting operation formed and arranged to cooperate with the hand of a person in positioning the fruit thereagainst as said blade is swung, said support including a movable member bearing against and steadying said fruit while held by the hand, and means for locking said movable member during the cutting action of the blade.

3. In a fruit pitting machine, a shaft, means rotatably supporting the shaft, an arched blade carried by the shaft, means for turning the shaft to swing said blade in an arcuate path for removing the pit or core of a fruit half presented thereto, a support for supporting the fruit during the pitting operation formed and arranged to cooperate with the hand of a person in positioning the fruit thereagainst as said blade is swung, said support including a movable member bearing against and steadying said fruit while held by the hand, and means automatically locking said movable member during the cutting action of the blade in whatever position it may be at start of the cutting operation.

4. In a fruit pitting machine, a supporting frame provided with a laterally extending member, a substantially horizontally disposed fruit support on said member with its under side formed to receive the face of a fruit-half, a bracket rotatably mounted on said frame, a shaft supported by said bracket for rotation therewith and extending horizontally over said fruit support, an arched blade carried at the end of said shaft positioned over said fruit support arranged to swing in an arcuate path through the plane of said support when said shaft is revolved for cutting out the pit or core of a fruit half held against the lower side of the support, and means mounting said shaft to said bracket providing movement of the shaft toward and from said fruit support.

5. In a fruit-half pitting machine, a support having a surface arranged in a manner whereby the cut face of a fruit-half is adapted to be held thereagainst by hand for pitting, a curved blade mounted on an axis extending approximately parallel to the plane of the fruit supporting surface and to swing the blade in an arc through the plane of said surface to cut out the half-pit or core of the fruit-half while so held, and a stop member extending substantially perpendicular to said surface toward which the blade swings while cutting the half-pit from the fruit-half and against which member an edge of the fruit-half abuts to resist the drag of the blade in passing through the fruit, said support being open to provide a clear view of the half-pit by the operative whereby the operative may easily position the fruit-half with respect to the blade in starting the cut.

6. A fruit-half pitting and coring machine comprising a floor pedestal, a supporting arm extending laterally from said pedestal, a fruit support having a flat surface against which the cut face of a fruit-half is adapted to be positioned for pitting, said fruit support carried by said arm and spaced laterally from said pedestal in a manner to be substantially over the lap of a seated operative, a curved coring blade adjacent said fruit support for cutting out the pit or core of a half-fruit presented thereto, means extending from said pedestal for supporting said blade and for swinging it on an axis extending approximately parallel to the plane of the fruit supporting surface and in an arc intercepting the same, said fruit support formed and adapted for the positioning and adjustment of a fruit-half thereagainst by the hand of an operative and arranged in a manner to provide an unobstructed space for the hand and to expose the half-pit or core of the fruit-half to the view of said operative whereby the fruit-half may be brought to position for proper entry of the blade relative to the pit or core.

7. A fruit-half pitting and coring machine comprising a pedestal, a supporting arm extending laterally from said pedestal, a fruit support having a surface against which the cut surface of a fruit-half is adapted to be positioned, said fruit support carried by said arm and spaced laterally from said pedestal, a curved coring blade above said fruit support for cutting out the pit or core of a half-fruit presented thereto, means extending from said pedestal supporting said blade for swinging on an axis extending approximately parallel to the plane of the fruit supporting surface and in an arc intercepting the same, said fruit support formed and adapted for the positioning and adjustment of a fruit-half thereagainst by the hand of an operative and arranged in a manner to expose the half-pit or core of the fruit-half to the view of an operative whereby the fruit-half may be brought to position for proper entry of the blade relative to the pit or core, manually operated means for swinging said blade in one direction, and automatically operated means for imparting return movement to said blade in the cutting stroke.

8. A fruit-half pitting and coring machine comprising a pedestal, a supporting arm extending laterally from said pedestal, a fruit support having a surface against which the cut surface of a fruit-half is adapted to be positioned, said fruit support carried by said arm and spaced laterally from said pedestal, a curved coring blade above said fruit support for cutting out the pit or core of a half-fruit presented thereto, means extending from said pedestal supporting said blade for swinging on an axis extending approximately parallel to the plane of the fruit supporting surface and in an arc intercepting the same, said fruit support formed and adapted for the positioning and adjustment of a fruit-half thereagainst by the hand of an operative and arranged in a manner to expose the half-pit or core of the fruit-half to the view of an operative whereby the fruit-half may be brought to position for proper entry of the blade relative to the pit or core, manually operated means for swinging said blade in one direction, and spring-operated means for imparting return movement to said blade in the cutting stroke.

9. A fruit-half pitting and coring machine comprising a pedestal, a supporting arm extending laterally from said pedestal, a fruit support having a surface against which the cut surface of a fruit-half is adapted to be positioned, said fruit support carried by said arm and spaced laterally from said pedestal, a curved coring blade above said fruit support for cutting out the pit or core of a half-fruit presented thereto, means extending from said pedestal for supporting said blade and for swinging it on an axis extending approximately parallel to the plane of the fruit supporting surface and in an arc intercepting the same, means for modifying the normal arc of travel of said blade around said axis upon swinging same through the fruit, said fruit support formed and adapted for the positioning and adjustment of a fruit-half thereagainst by the hand of an operative and arranged in a manner to expose the half-pit or core of the fruit-half to the view of an operative whereby the fruit-half may be brought to position for proper entry of the blade relative to the pit or core.

10. In a fruit-half pitting and coring machine, a curved coring blade, means supporting said blade to swing in an arcuate path, a fruit support positioned to support a fruit-half in the path of said blade for cutting out the half-pit or core of said fruit-half, said fruit support having a fruit receiving surface extending approximately parallel to the axis of said blade and against which surface the cut face of a fruit-half is adapted to be held by hand and said support formed to cooperate with and adapted to be embraced at its outer edges by the hand of the person holding the fruit-half in place for steadying the fruit-half against slipping during the pitting operation.

11. In a construction as specified in claim 10 said fruit support being an open end yoke arranged to bear against the two opposite margins of the face of the fruit-half.

12. In a fruit-half pitting and coring machine, a horizontally extending support provided with a flat undersurface against which the cut face of a fruit-half is adapted to be held by hand for pitting or coring, said support arranged to provide an unobstructed space beneath the same for the hand and formed with an opening arranged to expose the core or pit of the fruit-half from above to the view of an operative, a curved coring blade, means rotatably mounting said blade above the fruit supporting surface on an axis extending approximately parallel to the plane of said surface for swinging said blade downwardly into the fruit-half and around its core or pit to cut out the same while held by hand against the support, means provided whereby said blade and fruit support may yield relatively to one another for varying the cut in the fruit, said coring blade positioned at starting adjacent said support in a manner for sighting by the operative in relation to the core or pit and said support formed and adapted for manual adjustment of the fruit-half thereagainst relative to the blade preparatory to starting the cut.

13. In a fruit-half pitting and coring machine, a supporting frame, a bar extending laterally from said frame, means for turning the bar, an arched pitting and coring blade at the end of and extending from the side of the bar arranged to swing in an arc upon turning the bar, a fruit support having a surface extending approximately parallel with the general axis of swinging of the blade and against which surface the cut face of a fruit-half is adapted to be held for pitting, and means supporting said bar for movement toward and from said support substantially in the plane of the arch of the blade.

14. In a structure as specified in claim 13, the last mentioned means comprising a revolvable bracket to which said bar is pivoted at its end remote from said blade, and a guide for said bar between its point of pivoting and said blade.

15. In a structure as specified in claim 13, the last mentioned means comprising a revolvable bracket to which said bar is pivoted at its end remote from said blade, and a guide for said bar carried by said bracket between its point of pivoting and said blade.

16. In a structure as specified in claim 13, the last mentioned means comprising a revolvable bracket to which said bar is pivoted at its end remote from said blade, a pair of guides for said bar between its point of pivoting and said blade, and a roller on said bar operating between said guides.

17. In a fruit pitting and coring machine, a fruit support having a front and a rear which are respectively toward and away from the view of an operative using the machine, the rear of said support provided with a flat surface against which the cut face of a fruit half is adapted to be held by the hand of said operative for pitting or coring and arranged to provide an unobstructed space for the hand to adjust said fruit half, a curved coring blade, means mounting said blade on an axis extending substantially parallel to the plane of the fruit supporting surface to swing in an arc intercepting said plane for pitting or coring the fruit half while so held against the support, means provided whereby said blade and fruit support may yield relatively to one another for varying the cut in the fruit, said support and blade formed and arranged in a manner to present to said operative at the front of the support a clear view of the pit or core of the fruit half and the travel of the blade into the fruit.

JOSEPH P. BEM.